(12) United States Patent
Jones et al.

(10) Patent No.: US 9,964,222 B1
(45) Date of Patent: May 8, 2018

(54) FAILSAFE HOSE

(71) Applicants: Robert Jones, Louisville, KY (US); Nelson Knight, Louisville, KY (US); Neo Products Corporation, Henderson, TN (US)

(72) Inventors: Robert Jones, Louisville, KY (US); Nelson Knight, Louisville, KY (US); Richard Maness, Finger, TN (US)

(73) Assignee: NEO PRODUCTS CORPORATION, Henderson, TN (US)

( * ) Notice: Subject to any disclaimer, the term of this patent is extended or adjusted under 35 U.S.C. 154(b) by 0 days. days.

(21) Appl. No.: 15/256,925

(22) Filed: Sep. 6, 2016

Related U.S. Application Data

(63) Continuation-in-part of application No. 15/140,833, filed on Apr. 28, 2016.

(60) Provisional application No. 62/154,289, filed on Apr. 29, 2015.

(51) Int. Cl.
| | | |
|---|---|---|
| *F16K 17/40* | (2006.01) | |
| *F16K 17/36* | (2006.01) | |
| *F16L 11/20* | (2006.01) | |

(52) U.S. Cl.
CPC ............... *F16K 17/36* (2013.01); *F16L 11/20* (2013.01)

(58) Field of Classification Search
CPC .......... F16L 29/007; F16L 11/20; F16K 17/36
USPC ...................................................... 137/68.11
See application file for complete search history.

(56) References Cited

U.S. PATENT DOCUMENTS

| | | | |
|---|---|---|---|
| 1,993,666 A | 3/1935 | Hornell | |
| 2,608,205 A | 8/1952 | Proctor | |
| 3,145,732 A * | 8/1964 | Joles | ................ F16K 47/00 |
| | | | 137/514.3 |
| 3,472,253 A * | 10/1969 | Bartz | ................ F16K 17/40 |
| | | | 137/172 |
| 5,713,387 A | 2/1998 | Armenia et al. | |
| 5,758,682 A * | 6/1998 | Cain | ................ F16K 17/40 |
| | | | 137/543.13 |
| 5,771,916 A | 6/1998 | Armenia et al. | |
| 5,960,811 A | 10/1999 | Partridge | |
| 6,792,967 B1 | 9/2004 | Franklin | |
| 7,798,165 B2 | 9/2010 | McClung, Jr. | |
| 8,006,714 B1 * | 8/2011 | Martin | ................ A47L 15/421 |
| | | | 122/14.3 |

* cited by examiner

*Primary Examiner* — Craig Schneider
*Assistant Examiner* — P. Macades Nichols
(74) *Attorney, Agent, or Firm* — Wyatt, Tarrant & Combs, LLP; Matthew A. Williams; Max. E. Bridges

(57) ABSTRACT

A failsafe hose comprising an inlet fitting assembly and an outlet fitting assembly wherein the inlet fitting assembly and outlet fitting assembly are interconnected by an inner conduit and an outer conduit and the inlet fitting assembly further comprises a dissolvable element and a piston wherein the piston held in an open position by the dissolvable element wherein a leak in the inner conduit will result in the fluid being directed to the dissolvable element by the outer conduit and a method for assembling same.

17 Claims, 5 Drawing Sheets

FAILSAFE HOSE

CROSS-REFERENCE TO RELATED APPLICATIONS

This continuation-in-part patent application claims priority to and benefit from U.S. patent application Ser. No. 15/140,833, filed on Apr. 28, 2016, which claims priority to and benefit from, under 37 C.F.R. § 1.119(e), U.S. Provisional Patent Application Ser. No. 62/154,289 filed on Apr. 29, 2015, which is hereby incorporated by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention pertains to the field of fluid supply hoses that are under constant pressure from the fluid source, such as water hoses that deliver water to washing machines installed in residential housing.

2. General Background of the Invention

Rubber and other types of hoses are commonly used to deliver fluids to equipment such as automatic washing machines that call for fluid from time-to-time. In such applications, the fluid in the hose is often under pressure and the inlet side of the hose is connected to a supply, such as a metropolitan water supply, that is virtually unlimited in quantity. Thus when an unattended hose ruptures, especially in the case of washing machine supply hose in a residence, significant damage can result. To address this issue, numerous leak detection and leak mitigation apparatus have been developed but none are truly failsafe and many cannot be connected to standard hose connections.

For example, double wall hoses have been used in an attempt to mitigate or eliminate this risk. Such double wall hoses generally have an inner hose for conducting the fluid. The inner hose is surrounded by an outer hose to contain a leak should the inner hose rupture. In such a system, the outer hose may be connected to a drain to direct the fluid away from the rupture. But in either case, the rupture of the inner hose does not result in the fluid supply from the source being interrupted. Therefore, the user may not become aware of the rupture of the inner hose until the outer hose ruptures, resulting in a flood, or the user receives an enormous bill for the fluid that has been redirected down a drain.

Other efforts at solving this problem have involved the use of a soluble material that holds a spring-type device in an open position. If a leak occurs and dissolves the soluble material, the spring-type device will be triggered to shut off the water supply. But if the spring-type device fails, the water supply will not be shutoff In other words, such devices are not failsafe.

Other apparatus have been created that rely on an electronic sensor to initiate the termination of the fluid supply. Such apparatus are, however, prone to failure in in a manner that is not failsafe. For example, if a sensor to detect fluid in an overflow pan fails, it may not sense the presence of water and shutoff the supply. Similarly, if power is lost the system will not be able to shutoff the fluid supply unless backup power is provided.

In addition to these drawbacks, many mechanical solutions include devices on the inlet end of a hose that are bulky and difficult or impossible to install to a standard hose connection, such as a washer connection provided in a residence.

Thus, what is needed is hose that provides a failsafe solution in a streamlined design that will simply and easily connect to standard fittings to which any standard hose can be connected.

SUMMARY OF THE INVENTION

In summary, the present invention is a failsafe hose comprising an inlet fitting assembly and an outlet fitting assembly wherein the inlet fitting assembly and outlet fitting assembly are interconnected by an inner conduit and an outer conduit and the inlet fitting assembly further comprises a dissolvable element and a piston wherein the piston held in an open position by the dissolvable element wherein a leak in the inner conduit will result in the fluid being directed to the dissolvable element by the outer conduit.

BRIEF DESCRIPTION OF THE DRAWINGS

For a further understanding of the nature, objects, and advantages of the present invention, reference should be had to the following detailed description, read in conjunction with the attached figures, wherein like reference numerals denote like elements and wherein.

DETAILED DESCRIPTION OF THE INVENTION

Figure 1:
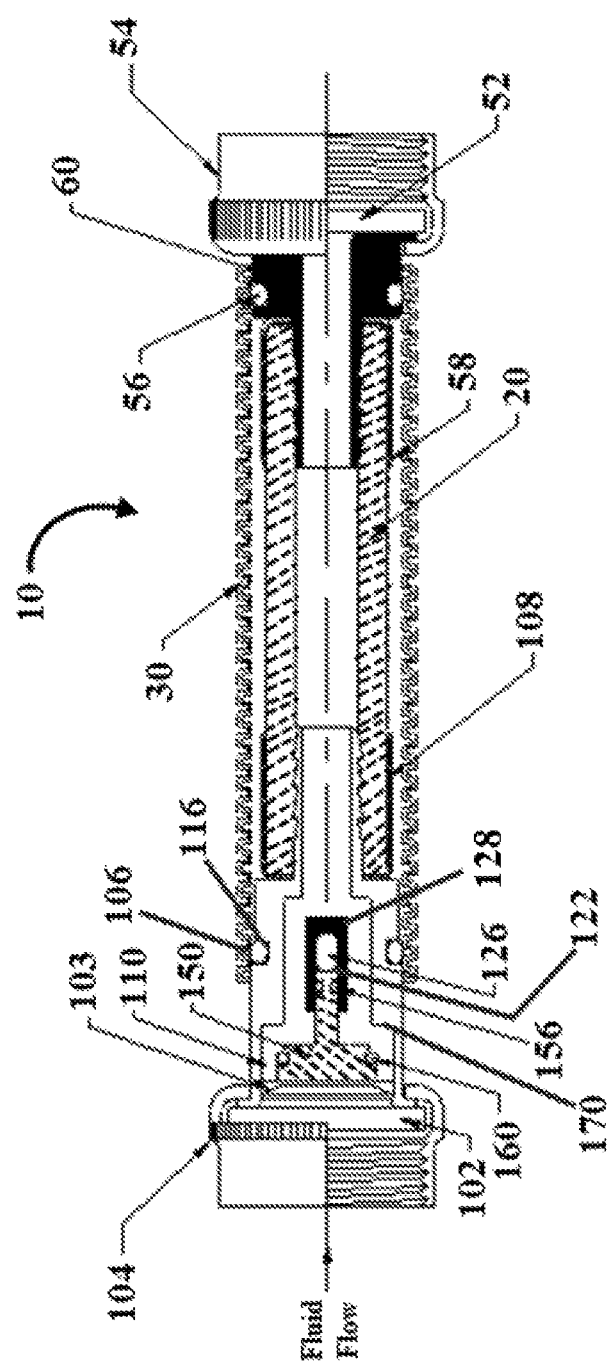
FIG. 1 is a cross-section view of an exemplary embodiment of the present invention.

The present invention relates to hoses used to supply water in applications wherein the water contained in the hose is under constant pressure, even when there is no flow through the hose. One of the primary applications for such hoses is hoses used to connect water supply lines to washing machines installed in personal residences. More specifically, the present invention is for a supply hose that fails in a safe condition, meaning that, if the hose were to rupture or otherwise leak, the leak would be contained and additional water flow through the hose would be terminated.

The present invention, hose 10, comprises inner conduit 20, outer conduit 30, outlet fitting assembly 50, and inlet fitting assembly 100. Outer conduit 30 is a flexible tube that extends from outlet fitting assembly 50 to inlet fitting assembly 100. Inner conduit 20 has an outer diameter that is smaller than the inner diameter of outer conduit 30 and extends from outlet fitting assembly 50 to inlet fitting assembly 100 within outer conduit 30 with gap 40 existing between the outer surface of inner conduit 20 and the inner surface of outer conduit 30. Forming outer conduit 30 from a compressible material such as flexible, corrugated plastic tubing, has been found to be advantageous in assembling hose 10.

Outlet fitting assembly 50 comprises washer 52, nut 54, O-ring 56, ferrule 58, and barbed fitting 60. Barbed fitting 60 defines a passage through which water exits hose 10 when the device hose 10 is connected to calls for water. Barbed fitting 60 includes flange 62 on the outlet side of barbed fitting 60. Shoulder portion 64 extends from flange 62 toward inlet fitting assembly 100 through a central opening defined in nut 54 such that nut 54 impinges on flange 62. Washer 52 is installed in nut 54 such that flange 62 is intermediate the portion of nut 54 defining said central opening and washer 52, thereby loosely holding nut 54 in place around barbed fitting 60. Annular recess 66 is defined in shoulder portion 64 of barbed fitting 60 and spaced apart from flange 62. O-ring 56 is received by annular recess 66, with annular recess 66 having a depth that is sufficient to hold O-ring 56 firmly in place but allows O-ring 56 to stand proud of the outer surface of shoulder portion 64 of barbed fitting 60. When outer conduit 30 is affixed to outlet fitting assembly 50, O-ring 56 engages the inner surface of outer conduit 30 to form a watertight seal. Barbed portion 68 of barbed fitting 60 extends from shoulder portion 64 toward inlet fitting assembly 100 and has an outer diameter that is less than the inner diameter of inner conduit 20. Once barbed portion 68 is inserted into the outlet end of inner conduit 20, ferrule 58 is compressed around the outlet end portion of inner conduit 20 to form a pressure resistant, watertight connection between outlet fitting assembly 50 and inner conduit 20.

Inlet fitting assembly 100 comprises washer 102, screen 103, nut 104, O-ring 106, ferrule 108, and failsafe fitting 110. Failsafe fitting 110 defines central passage 101 through which water enters hose 10 from the water supply when the device hose 10 is connected to calls for water. Failsafe fitting 110 includes flange 112 on the outlet side of failsafe fitting 110. Shoulder portion 114 extends from flange 112 toward outlet fitting assembly 50 through a central opening defined in nut 104 such that nut 104 impinges on flange 112. Washer 102 is installed in nut 104 such that flange 112 is intermediate the portion of nut 104 defining said central opening and washer 102, thereby loosely holding nut 104 in place around failsafe fitting 110. Screen 103 is located intermediate washer 102 and flange 112. Annular recess 116 is defined in shoulder portion 114 of failsafe fitting 110 and spaced apart from flange 112. O-ring 106 is received by annular recess 116, with annular recess 116 having a depth that is sufficient to hold O-ring 106 firmly in place but allows O-ring 106 to stand proud of the outer surface of shoulder portion 104 of failsafe fitting 110. When outer conduit 30 is affixed to inlet fitting assembly 100, O-ring 106 engages the inner surface of outer conduit 30 to form a watertight seal. Barbed portion 118 of failsafe fitting 110 extends from shoulder portion 114 toward inlet fitting assembly 100 and has an outer diameter that is less than the inner diameter of inner conduit 20. Once barbed portion 118 is inserted into the outlet end of inner conduit 20, ferrule 108 is compressed around the outlet end portion of inner conduit 20 to form a pressure resistant, watertight connection between inlet fitting assembly 100 and inner conduit 20.

Figure 2:
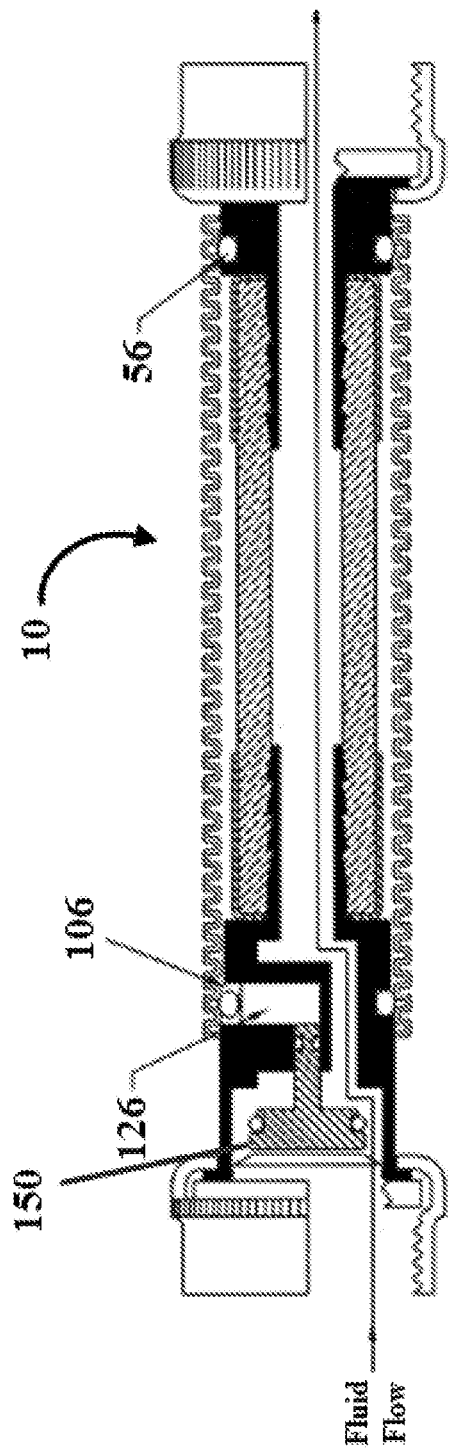
FIG. 2 is a cross-section view of an exemplary embodiment of the present invention taken at a 90 degree angle from FIG. 1.
Figure 3:
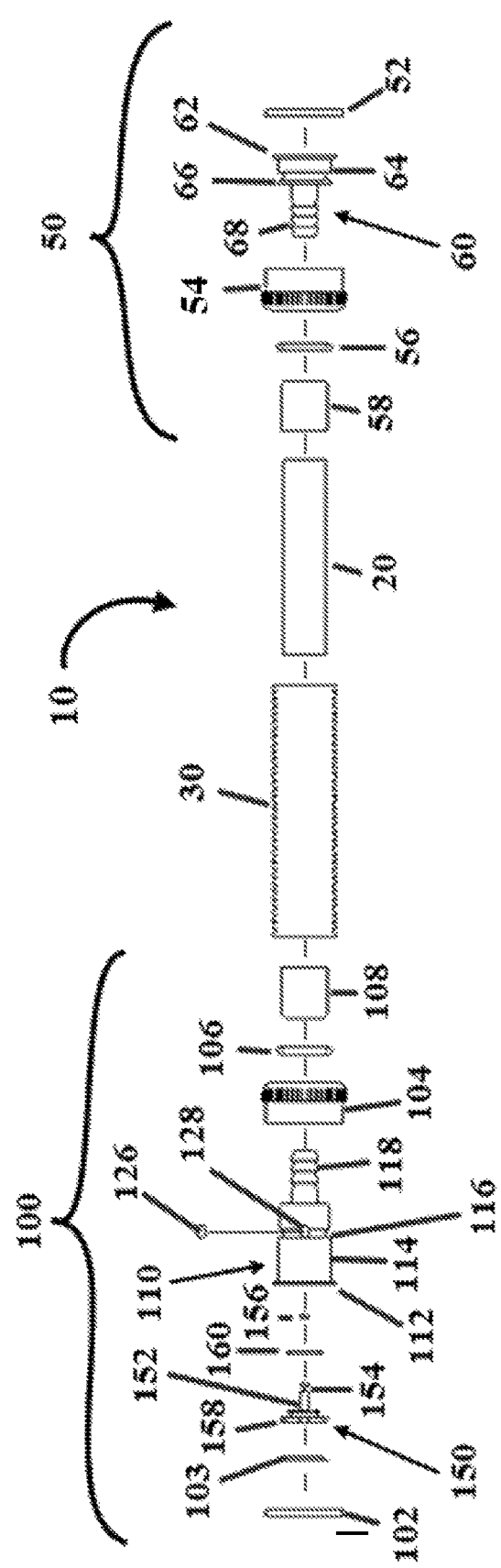
FIG. 3 is an exploded view of the exemplary embodiment of the invention.
Figure 5:
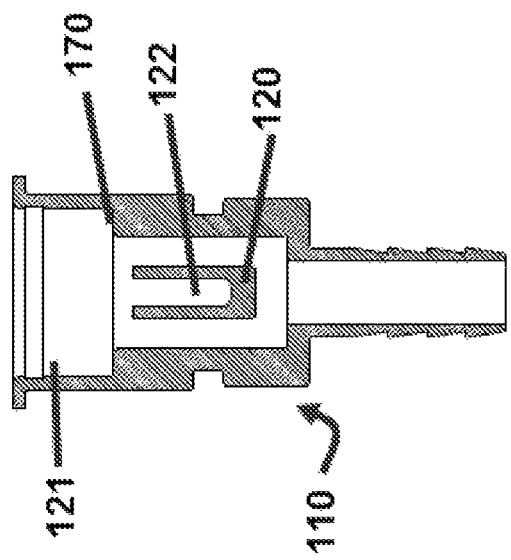
FIG. 5 is a side cross-section view of an exemplary embodiment of an inlet fitting portion of the present invention.
Figure 4:
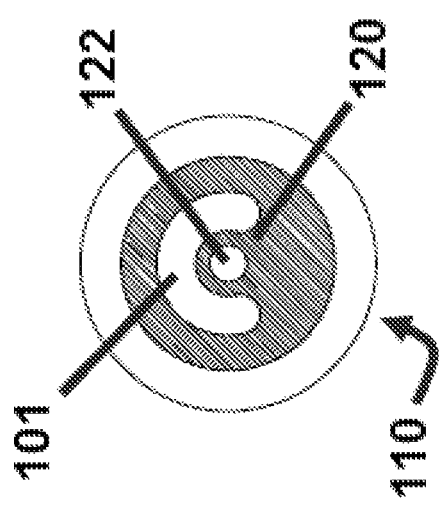
FIG. 4 is a top cross-section view of an exemplary embodiment of an inlet fitting portion of the present invention.
Figure 7:
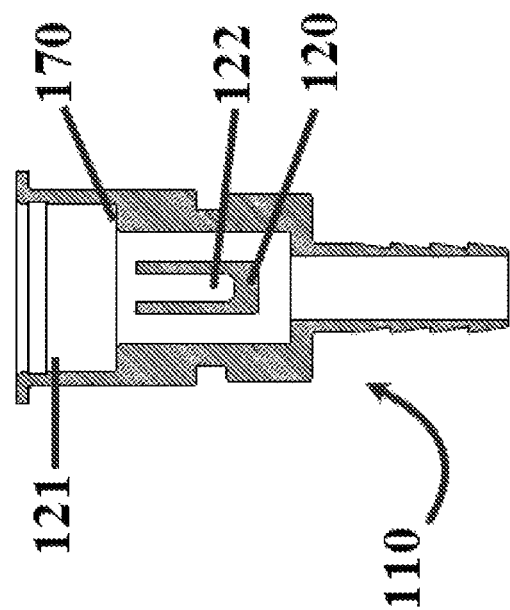
FIG. 7 is a side cross-section view of an alternate exemplary embodiment of an inlet fitting portion of the present invention.
Figure 6:
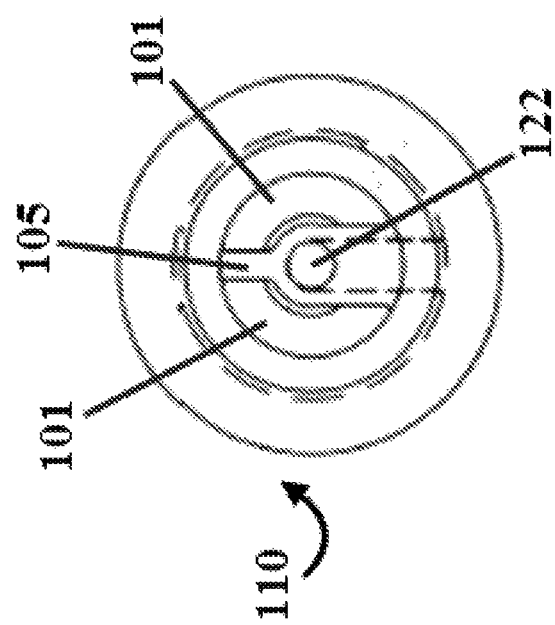
FIG. 6 is a top cross-section view of an alternate exemplary embodiment of an inlet fitting portion of the present invention.

Failsafe fitting 110 further comprises projection 120 that extends from wall 121 that defines central passage 101. Blind bore 122 is defined in projection 120 with the opening of blind bore 122 facing the inlet side of hose 10. Dissolvable element 126 is located in blind bore 122 and may extend into duct 128. Dissolvable element 126 is formed from a material that is water soluble and will dissolve in no more than ten (10) minutes. Such materials include, but are not limited to, salt, ibuprofen, and acetylsalicylic acid. Duct 128 is defined in failsafe fitting 110 such that a first opening of duct 128 connects to blind bore 126 and a second end of duct 128 connects duct 128 to gap 40. In the illustrated embodiment, duct 128 emerges partially within annular recess 116, but to achieve the desired functionality duct 128 could emerge at any point on the outer surface of failsafe fitting 110 such that it is between O-ring 106 and end of inner conduit 20 and within gap 40. When duct 128 emerges within annular recess 116, dissolvable element can be provided with a length sufficient to be held in place by O-ring 106 as shown in FIG. 2. In an alternate embodiment, shown in FIGS. 6 and 7, failsafe fitting 110 may include one or more supporting ribs 105 that extend from wall 121 to projection 120 creating two or more channels for liquid flow through central passage 101. This alternate embodiment also shows that shoulder portion 114 failsafe fitting 110 may be provided with a chamfered end portion to facilitate the assembly of outer conduit 30 to failsafe fitting 110.

Failsafe fitting 110 further includes piston 150. Piston 150 includes stem 152 that is sized to be inserted into blind bore 122. Annular recess 154 is located toward the end of stem 152 that is inserted into blind bore 122. O-ring 156 is located in annular recess 154 and forms a watertight seal against the wall of blind bore 122 to prevent dissolvable element 126 from being exposed to water during normal use of hose 10. Piston 150 further comprises flange 158, which is located at the upstream end of stem 152. Surrounding flange 158 and biased toward the downstream surface of flange 158 is O-ring 160, which can be retained in an annular channel defined in the periphery of flange 158.

Failsafe fitting 110 further includes ledge 170 that is located upstream of projection 120 within central passage 101. Ledge 170 serves to narrow the diameter of central passage 101 and provides a surface for O-ring 160 to compress against and cutoff the flow of water in the event that water is introduced into blind bore 122 causing dissolvable element 126 to dissolve. The pressure of incoming water against the upstream surface of flange 158 will keep the seal in place until the water supply is disconnected and the pressure released.

Because nuts 54 and 104 can be standard hose nuts, hose 10 can be used in all existing applications without having to adjust the spacing of current washer connections. Thus, hose 10 can be easily installed into existing applications as a direct replacement to a standard hose that is not failsafe. In operation, hose 10 functions exactly as a standard hose, providing a pressurized fluid connection between a supply fitting connected to a water main and an intermittently operated valve on an washing machine or similar device.

Should a leak develop in pressurized inner conduit 20, either at its connection point to inlet fitting assembly 100 or outlet fitting assembly 50 or a leak in inner conduit 20 itself, the pressurized water will fill gap 40. Once this occurs, water will travel though duct 128 from the now water-filled gap into blind bore 122, which will cause dissolvable element 126 to dissolve. Once dissolvable element 126 has dissolved, the pressure of the incoming water on flange 158 will cause piston 150 to slide into blind bore 122 until O-ring 160 impinges on ledge 170 forming a watertight seal precluding further flow of water through hose 10.

Assembly of Failsafe Hose 10
1. Place outer conduit 30 into fixture and compressing outer conduit 30 in a lengthwise direction.
2. Slide inner conduit 20 through outer conduit 30.
3. Slide ferrules 58 and 108 onto inner conduit 20.
4. Insert barbed fitting 60 through nut 54.
5. Assemble O-ring 56 into annular recess 66 defined in shoulder portion 64 of barbed fitting 60.
6. Push barbed portion 68 of barbed fitting 60 into outlet end of inner conduit 20.
7. Crimp ferrule 58 around end portion of inner conduit 20 to compress inner conduit 20 against barbed portion 68 of barbed fitting 60.
8. Insert failsafe fitting 110 through nut 104.
9. Assemble O-ring 106 onto shoulder portion 114 of failsafe fitting 110 without placing O-ring 106 into annular recess 116.
10. Insert barbed portion 118 of failsafe fitting 110 into inlet end of inner conduit 20.
11. Crimp ferrule 108 around end portion of inner conduit 20 to compress inner conduit 20 against barbed portion 118 of failsafe fitting 110.
12. Insert assembly tool 170 (not pictured) through duct 128 into blind bore 122 to prevent piston 150 from bottoming out when assembled into failsafe fitting 110. (Assembly tool 170 comprises a cylindrical shaft with an end portion profiled to simulate dissolvable element 126 being in place during the assembly process.)
13. Assemble O-ring 160 onto piston 150 adjacent to flange 158.
14. Assemble O-ring 156 into annular recess 154 in stem 152 or piston 150.
15. Insert stem 152 of piston into blind bore 122 until piston 150 bottoms out against assembly tool 170.
16. Insert screen 103 into nut 104.
17. Insert washer 102 into nut 104 such that screen 103 is intermediate washer 102 and flange 112.
18. Remove assembly tool 170 from duct 128.
19. Insert dissolvable element 126 into blind bore 122 via duct 128.
20. Locate O-ring 106 into annular recess 116 defined in shoulder portion 114 of failsafe fitting 110.
21. Release outer conduit 30.
22. Slide the inlet end over failsafe fitting 110 to allow O-ring 106 to engage the inner surface of outer conduit 30.
23. Slide the outlet end over barbed fitting 60 to allow O-ring 56 to engage the inner surface of outer conduit 30.

Alternatively, inlet fitting assembly 100 can be completely assembled (steps 8-9 and 12-20). Completed inlet assembly 100 can then be assembled to inner conduit 20 and outer conduit 30 as described in steps 10-11 and 21-22.

The foregoing described embodiments are exemplary in nature and are not intended to limit the scope of the invention.

We claim:
1. A failsafe hose comprising:
an inlet fitting assembly and
an outlet fitting assembly;
said inlet fitting assembly and outlet fitting assembly being interconnected by an inner conduit and an outer conduit;
said inlet fitting assembly further comprises a dissolvable element and a piston, said piston being held in an open position by said dissolvable element;
said inlet fitting assembly further comprises a failsafe fitting, said failsafe fitting having
a barbed outlet end portion, said barbed outlet end portion being received by said inner conduit;
a blind bore defined in a projection extending into a central passage defined in said failsafe fitting, an entrance to said blind bore facing an inlet side of said hose;
an annular recess defined in a shoulder portion of said failsafe fitting, said annular recess being sized to receive an O-ring such that an inner surface of said outer conduit engages said O-ring to form a fluid tight seal; and
a duct, said duct extending from an outer portion of said failsafe fitting to a closed end portion of said blind bore;
said dissolvable element being located within said blind bore;
said piston having a stem portion, said stem portion extending into said blind bore and impinging on said dissolvable element such that said piston is held in an open position to allow fluid flow through said central passage.

2. The failsafe hose of claim 1 wherein an annular recess is defined in the stem portion of the piston, said annular recess being sized to receive an O-ring such that said O-ring engages a wall of the blind bore to prevent fluid passing through the central passage defined in the failsafe fitting from reaching the dissolvable element through the blind bore and
an annular recess defined in the disc-shaped end portion of the piston, said annular recess being sized to receive an O-ring such that said O-ring will engage a ledge defined by a portion of the failsafe fitting surrounding the central passage defined in the failsafe fitting and prevent fluid from flowing through the failsafe hose if the dissolvable element is not present.

3. The failsafe hose of claim 1 where the dissolvable element is formed from salt.

4. The failsafe hose of claim 1 where the dissolvable element is formed from ibuprofen.

5. The failsafe hose of claim 1 where the dissolvable element is formed from acetylsalicylic acid.

6. The failsafe hose of claim 1 wherein
the duct extends from an outer portion of said failsafe fitting within the annular recess defined in the shoulder portion of said failsafe fitting and
the dissolvable element is sized to extend from said blind bore to an end of the duct and is held in place by said O-ring received by the annular recess defined in the shoulder portion of said failsafe fitting.

7. The failsafe hose of claim 6 where the dissolvable element is formed from a dissolvable material selected from the group of salt, ibuprofen, and acetylsalicylic acid.

8. A failsafe hose comprising:
an inlet fitting assembly connected to an outlet fitting assembly by an inner conduit wherein said inner conduit provides a path for a fluid to flow from said inlet fitting assembly to said outlet fitting assembly;
an outer conduit extending from said inlet fitting to said outlet fitting and surrounding said inner conduit, said outer conduit having an inner diameter greater than the outer diameter of said inner conduit thereby creating a gap to receive fluid from said inner conduit should a leak form in said inner conduit;

said inlet fitting assembly further comprising
- a failsafe fitting, said failsafe fitting defining a central passage, a bore, a ledge, and a duct, said duct extending from a closed end of said bore to the gap between said outer conduit and said inner conduit;
- a dissolvable element, said dissolvable element located at the closed end of said bore;
- a piston; said piston having a disc end portion and a stem end portion, wherein
  - the stem end portion extends into said bore, impinging on said dissolvable element and
  - the disc end portion being oriented toward the inlet end of said failsafe hose and having a diameter sufficient to engage said ledge and seal said central passage to fluid flow if the dissolvable element is not present.

9. The failsafe hose of claim 8 wherein the stem portion of the piston further comprises an O-ring, said O-ring being sized to engage a wall of the blind bore to prevent fluid passing through the central passage defined in the failsafe fitting from reaching the dissolvable element through the blind bore and
   the disc end portion of the piston further comprises an O-ring, said O-ring being sized to engage said ledge to prevent fluid from flowing through the failsafe hose if the dissolvable element is not present.

10. The failsafe hose of claim 8 where the dissolvable element is formed from a dissolvable material selected from the group of salt, ibuprofen, and acetylsalicylic acid.

11. The failsafe hose of claim 8 where the dissolvable element is formed from salt.

12. The failsafe hose of claim 8 where the dissolvable element is formed from ibuprofen.

13. The failsafe hose of claim 8 where the dissolvable element is formed from acetylsalicylic acid.

14. A failsafe inlet fitting assembly for a hose having an inner and outer conduit, said failsafe inlet fitting assembly comprising:
   a failsafe fitting, said failsafe fitting having
   - a barbed outlet end portion to be connected to the inner conduit of the hose;
   - a blind bore defined in a projection extending into a central passage defined in said failsafe fitting, an entrance to said blind bore facing an inlet side of said hose;
   - an annular recess defined in a shoulder portion of said failsafe fitting, said annular recessed being sized to receive an O-ring such the O-ring will engage an inner surface of the outer conduit of the hose to form a fluid tight seal; and
   - a duct, said duct extending from an outer portion of said failsafe fitting to a closed end portion of said blind bore;
   said dissolvable element being located within said blind bore;
   a piston having a stem portion, said stem portion extending into said blind bore and impinging on said dissolvable element such that said piston is held in an open position to allow fluid flow through said central passage.

15. The failsafe inlet fitting assembly of claim 14 wherein the stem portion of the piston further comprises an O-ring, said O-ring being sized to engage a wall of the blind bore to prevent fluid passing through the central passage defined in the failsafe fitting from reaching the dissolvable element through the blind bore and
   a disc end portion of the piston further comprises an O-ring, said O-ring being sized to engage a ledge to prevent fluid from flowing through the failsafe hose if the dissolvable element is not present.

16. The failsafe inlet fitting assembly of claim 14 wherein
   the duct extends from an outer portion of said failsafe fitting within the annular recess defined in the shoulder portion of said failsafe fitting and
   the dissolvable element is sized to extend from said blind bore to an end of the duct and is held in place by said O-ring received by the annular recess defined in the shoulder portion of said failsafe fitting.

17. The failsafe inlet fitting assembly of claim 14 where the dissolvable element is formed from a dissolvable material selected from the group of salt, ibuprofen, and acetylsalicylic acid.

* * * * *